US011625301B2

(12) United States Patent
Bao et al.

(10) Patent No.: US 11,625,301 B2
(45) Date of Patent: Apr. 11, 2023

(54) METHOD, ELECTRONIC DEVICE AND COMPUTER PROGRAM PRODUCT FOR MANAGING DISKS

(71) Applicant: EMC IP Holding Company LLC, Hopkinton, MA (US)

(72) Inventors: Haiyun Bao, Beijing (CN); Changrui Shao, Beijing (CN); Rongrong Shang, Beijing (CN); Haiying Tang, Beijing (CN); Baoan Yuan, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/532,194

(22) Filed: Nov. 22, 2021

(65) Prior Publication Data

US 2022/0342757 A1    Oct. 27, 2022

(30) Foreign Application Priority Data

Apr. 23, 2021    (CN) .......................... 202110441733.9

(51) Int. Cl.
*G06F 11/10*    (2006.01)
*G06F 11/07*    (2006.01)
*G06F 3/06*    (2006.01)

(52) U.S. Cl.
CPC ........ *G06F 11/1088* (2013.01); *G06F 3/0619* (2013.01); *G06F 3/0659* (2013.01); *G06F 3/0689* (2013.01); *G06F 11/076* (2013.01)

(58) Field of Classification Search
CPC ............ G06F 11/1088; G06F 11/1076; G06F 3/0619; G06F 3/0639; G06F 3/0689
See application file for complete search history.

(56) References Cited

U.S. PATENT DOCUMENTS

| 11,194,487 | B2* | 12/2021 | Zhuo ..................... G06F 3/0629 |
| 2003/0074527 | A1* | 4/2003 | Burton ................... G06F 3/0601 711/114 |
| 2019/0065093 | A1 | 2/2019 | Karr et al. |
| 2020/0117386 | A1 | 4/2020 | Dong et al. |
| 2021/0132845 | A1 | 5/2021 | Shang et al. |
| 2022/0011955 | A1 | 1/2022 | Juch et al. |

* cited by examiner

*Primary Examiner* — Nadeem Iqbal
(74) *Attorney, Agent, or Firm* — BainwoodHuang

(57) ABSTRACT

Techniques for managing disks involve: determining, from multiple disks, a first disk set for providing redundant storage, the number of disks included in the first disk set being not less than a first threshold number that corresponds to the number of disks required to be included in a redundant array of independent disks; determining, based on the multiple disks, a candidate solution in which at least the first disk set is used to provide redundant storage; determining an unavailable capacity that the candidate solution will have; and determining, based on the unavailable capacity and the candidate solution, a target solution for providing the redundant storage. Accordingly, such techniques can promote efficient management of disks.

21 Claims, 5 Drawing Sheets

METHOD, ELECTRONIC DEVICE AND COMPUTER PROGRAM PRODUCT FOR MANAGING DISKS

CROSS-REFERENCE TO RELATED APPLICATION

This application claims priority to Chinese Patent Application No. CN202110441733.9, on file at the China National Intellectual Property Administration (CNIPA), having a filing date of Apr. 23, 2021, and having "METHOD, ELECTRONIC DEVICE AND COMPUTER PROGRAM PRODUCT FOR MANAGING DISKS" as a title, the contents and teachings of which are herein incorporated by reference in their entirety.

TECHNICAL FIELD

Embodiments of the present disclosure relate to the field of computers, and more particularly, to a method, an electronic device, and a computer program product for managing disks.

BACKGROUND

At present, storage systems are usually constructed using redundant array of independent disks (RAID) technologies. In order to achieve high reliability of a storage system, it is necessary to limit the number of disks involved in the reconstruction of this storage system. For example, when the number of disks in a storage system is large, if these disks are not effectively managed, problems such as low working efficiency and low storage reliability of the storage system may be caused.

SUMMARY OF THE INVENTION

The embodiments of the present disclosure provide a solution for managing disks.

In a first aspect of the present disclosure, a method for managing disks is provided. The method includes: determining, from multiple disks, a first disk set for providing redundant storage, the number of disks included in the first disk set being not less than a first threshold number that corresponds to the number of disks required to be included in a redundant array of independent disks; determining, based on the multiple disks, a candidate solution in which at least the first disk set is used to provide redundant storage; determining an unavailable capacity that the candidate solution will have; and determining, based on the unavailable capacity and the candidate solution, a target solution for providing the redundant storage.

In a second aspect of the present disclosure, an electronic device is provided, including a processor; and a memory coupled to the processor, wherein the memory has instructions stored therein which, when executed by the processor, cause the electronic device to perform actions including: determining, from multiple disks, a first disk set for providing redundant storage, the number of disks included in the first disk set being not less than a first threshold number that corresponds to the number of disks required to be included in a redundant array of independent disks; determining, based on the multiple disks, a candidate solution in which at least the first disk set is used to provide redundant storage; determining an unavailable capacity that the candidate solution will have; and determining, based on the unavailable capacity and the candidate solution, a target solution for providing the redundant storage.

In a third aspect of the present disclosure, a computer program product is provided. The computer program product is tangibly stored on a computer-readable medium and includes machine-executable instructions, wherein the machine-executable instructions, when executed, cause a machine to perform any steps of the method according to the first aspect.

The Summary of the Invention part is provided to introduce the selection of concepts in a simplified form, which will be further described in the Detailed Description below. The Summary of the Invention part is neither intended to identify key features or main features of the present disclosure, nor intended to limit the scope of the present disclosure.

BRIEF DESCRIPTION OF THE DRAWINGS

The above and other objectives, features, and advantages of the present disclosure will become more apparent by describing example embodiments of the present disclosure in more detail with reference to the accompanying drawings, and in the example embodiments of the present disclosure, the same reference numerals generally represent the same components. In the accompanying drawings.

DETAILED DESCRIPTION

Figure 1:
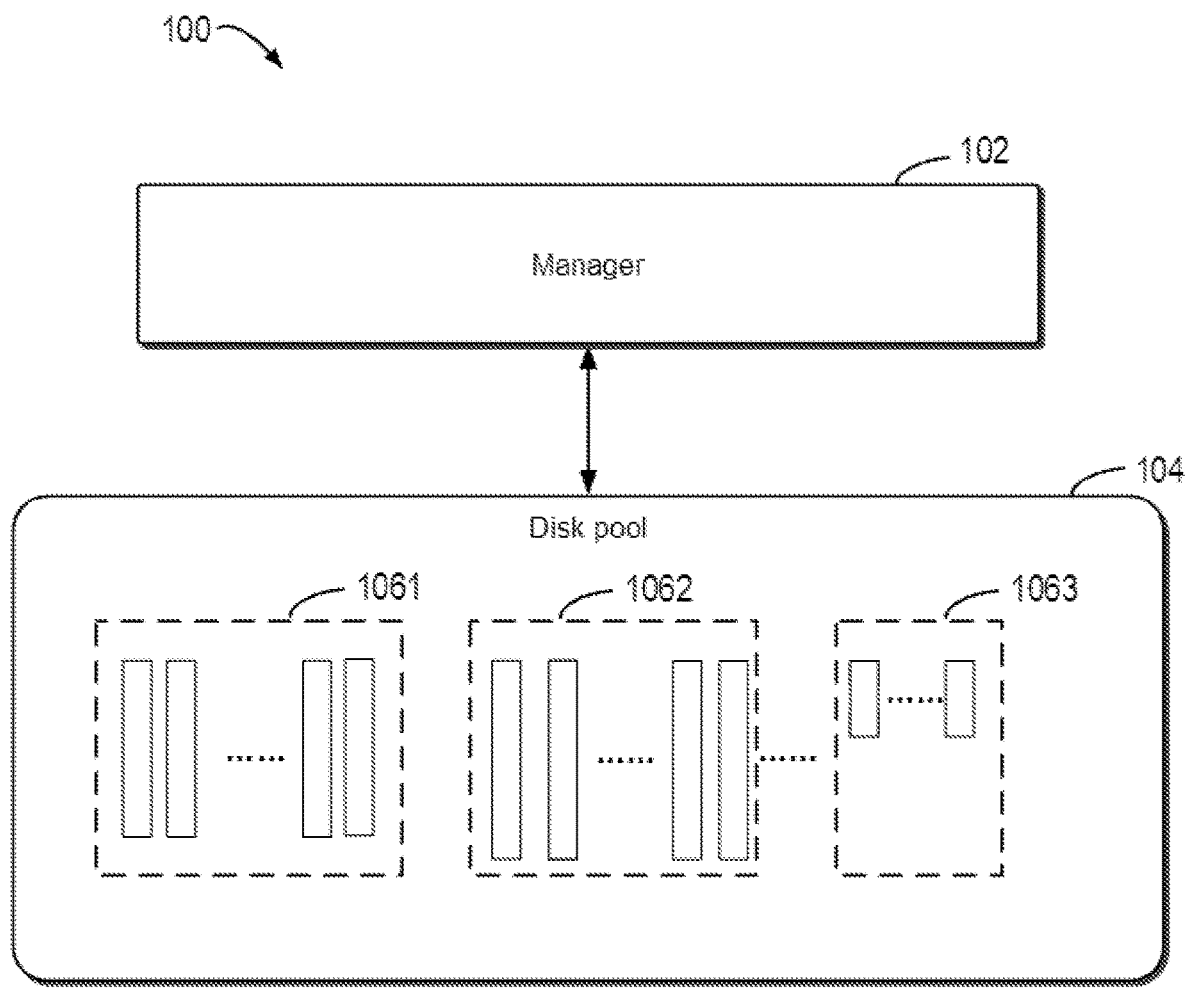
FIG. 1 illustrates a schematic diagram of an example environment according to embodiments of the present disclosure.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The principles of the present disclosure will be described below with reference to some example embodiments shown in the accompanying drawings.

As used herein, the term "include" and variations thereof mean open-ended inclusion, that is, "including but not limited to." Unless specifically stated, the term "or" means "and/or." The term "based on" means "based at least in part on." The terms "an example embodiment" and "an embodiment" indicate "a group of example embodiments." The term "another embodiment" indicates "a group of additional embodiments." The terms "first," "second," etc. may refer to different or the same objects. Other explicit and implicit definitions may also be included below.

As discussed above, in order to ensure the reliability of a RAID-based storage system, especially when a disk fails, it is often necessary to use data in other disks to recover data in the failed disk. Therefore, it is generally necessary to allocate segments or slices to RAID stripes in a limited number of disks. These limited number of disks form a disk set. If the number of disks in the storage system exceeds the limited number, one further disk set can be allocated. In other words, multiple disks can be allocated into one or more disk sets depending on the number of disks. One example of a disk set is a RAID resilience set (RRS).

The limited number for a disk set usually needs to meet the following two conditions: the number of disks should be able to meet the minimum number of disks required to build a RAID stripe, and the number of disks should not exceed a predetermined maximum number of disks. This is because the possibility of failure rises accordingly when the number of disks is too large, which in turn leads to a decrease in reliability, and the reconstruction process of all disks in the disk set to recover the failure will be quite long. For example, for a RAID 5 with a disk array width of 4+1, the minimum number of disks will be 6 and the maximum number of disks will be 25. It will be understood that there are multiple standards for RAID, for example, RAID 1, RAID 2, RAID 3, RAID 4, RAID 5, RAID 6, and RAID 10, and the above-mentioned minimum number of disks and maximum number of disks will be set accordingly.

In general, it is expected that the constructed one or more sets have a large (e.g., maximum) total effective capacity. The effective capacity refers to the disk capacity that can be used to provide available disk slices to disk slice sets formed by the disks in the disk set. However, since storage disks may have different capacities, the total effective capacities of multiple disk sets constructed by different allocation manners from the same multiple disks are not necessarily the same.

Because disks in the same disk set do not necessarily have the same capacity as each other, it is possible that some disk slices of some disks cannot be used for storage. This may lead to a waste of that part of physical storage capacity of those disk slices of the disks, thus resulting in wasted capacity. Moreover, for the purpose of reliability, it is generally necessary to reserve some reserved capacity in the storage disk set. Neither the reserved capacity nor the wasted capacity can be used to provide available disk slices, so they are considered as unavailable capacity in the disk set.

For ease of description, the unavailable capacity will be illustrated below using a specific example. Assume that there are 9 disks in total, of which 3 disks have a capacity of 16 TB, 4 disks have a capacity of 8 TB, and 2 disks have a capacity of 4 TB. Therefore, two 4 TB disks can be considered to be able to provide the first part (4 TB) of disk slices, four 8 TB disks can be considered to be able to provide the first part (4 TB) and the second part (4 TB) of disk slices, and three 16 TB disks can be considered to be able to provide the first part (4 TB), the second part (4 TB), and the third part (8 TB) of disk slices. Therefore, among those 9 disks, there are 9 disks with the first part of disk slices, 7 disks with the second part of disk slices, and 3 disks with the third part of disk slices, wherein the first and second parts of disk slices are able to meet the minimum number (i.e., 6) of disks required to provide redundant storage based on RAID 5. However, the third part of disk slices cannot meet the minimum number (i.e., 6) of disks required to provide redundant storage based on RAID 5, so the capacity of this third part is considered as wasted capacity, i.e., 24 TB. Given the requirement of RAID 5 for reserved capacity, one 8 TB disk will be used to provide the reserved capacity. Therefore, the unavailable capacity of the disk set constructed from the 9 disks will be 32 TB, and the total effective capacity will be 56 TB.

For a more detailed discussion about RAID, RRS, the minimum and maximum numbers of disks associated with RRS, disk slices, wasted capacity, reserved capacity, unavailable capacity, etc., reference can be made to Chinese Patent Application Nos. 201911052954.6, 201910336148.5, and 201911050325.X that are assigned to this applicant, the entire contents of such applications being incorporated herein by reference.

Some disk allocation algorithms (e.g., heuristic algorithm-based disk allocation algorithms) have been proposed, and some examples of the algorithms include those algorithms described in, for example, 201911052954.6, 201910336148.5, and 201911050325.X. Each of these algorithms is able to quickly (e.g., consume fewer computing resources and/or take less time) allocate multiple disks to multiple disk sets and make the total effective (available) capacity as high as possible. In other words, the unavailable capacity is as low as possible. However, conventional solutions cannot verify whether a disk allocation solution determined by such algorithm is an optimal solution, i.e., whether it has the maximum effective capacity (or the minimum unavailable capacity).

To at least partially address the above disadvantages, the embodiments of the present disclosure provide a solution for managing disks. This solution first determines, from multiple disks to be allocated, one candidate disk set as one disk collection to be used in a candidate disk allocation solution, then estimates an estimated unavailable capacity of the candidate disk allocation solution by using an unavailable-capacity estimation function, and determines whether the estimated unavailable capacity of that candidate disk allocation solution is currently optimal, and if so, proceeds with disk allocation based on that candidate disk allocation solution that includes that candidate disk collection. The updated estimated unavailable capacity of the candidate disk allocation solution is always ensured to be currently optimal until the allocation of all the disks to be allocated among the multiple disks to be allocated is completed. By accurately determining the disk allocation solution with the minimum unavailable capacity, this solution can facilitate efficient management of disks.

FIG. 1 illustrates a schematic diagram of example environment 100 according to embodiments of the present disclosure, in which a device and/or method according to embodiments of the present disclosure can be implemented. As shown in FIG. 1, as shown in FIG. 1, example environment 100 may include disk pool 104. Disk pool 104 may include (multiple) storage disks for storing data (e.g., compressed data packets). The storage disks may be various types of devices with a storage function, including but not limited to a hard disk drive (HDD), a solid state disk (SSD), a removable disk, any other magnetic storage device and any other optical storage device, or any combination thereof.

Disk pool 104 may include multiple disks having different capacities, for example, cluster 1061 of first disks having a first capacity (e.g., 8 TB), cluster 1062 of second disks having a second capacity (e.g., 16 TB), and cluster 1063 of multiple third disks having a third capacity (e.g., 4 TB). It may also include one or more disks having other capacities. Multiple disks can be allocated to one or more disk sets to provide redundant storage. A disk set can be a RAID resilience set (RRS) as described above.

Example environment 100 may also include manager 102, and in some embodiments, manager 103 can be implemented by any computing device with computing power. Manager 102 can be configured to allocate the multiple disks (e.g., clusters 1061 to 1063 of disks) having different capacities to multiple disk sets. As described above, the number of disks that each disk set can include has a lower limit (e.g., a first threshold number) and an upper limit (e.g., a second threshold number) to facilitate fast data reconstruction while ensuring a high level of reliability. In some embodiments, in a RAID 5-based disk set, the first threshold number is 6, and the second threshold number is 25. Manager 102 can dynamically acquire the total number of disks in the disk pool and their corresponding capacities. In response to a change in the total number of disks, manager 102 can be configured to re-allocate multiple disks to multiple new disk sets.

It will be understood that, when the total number of disks is large, the numbers of possible allocation solutions for disk sets will be massive and it will be difficult to determine an optimized disk allocation solution from them. In some embodiments, the optimized disk allocation solution can be determined by traversing all possible combinations, but such process will consume a lot of computing resources and take a long time. In some embodiments, manager 102 can be configured to determine a disk allocation solution (herein, a disk allocation solution is sometimes also referred to simply as a solution) based on information related to multiple disks and according to a first algorithm (such as those algorithms described in 201911052954.6, 201910336148.5, and 201911050325.X). It will be understood that in a disk allocation solution, all disks in the multiple disks will be used to construct multiple disk sets. It is expected that the total effective capacity of the disk allocation solution is as large as possible (e.g., maximum) and thus the unavailable capacity is as small as possible (e.g., minimum). In some embodiments, by executing the first algorithm, an optimized disk allocation solution can be obtained within a few hours (e.g., not more than 5 hours).

In some embodiments, the manager can be configured to determine a disk allocation solution based on information related to multiple disks and according to various methods disclosed herein. In some embodiments, the various methods disclosed herein can ensure that the total effective capacity of the obtained disk allocation solution is as large as possible (e.g., maximum) and thus the unavailable capacity is as small as possible (e.g., minimum). In some embodiments, performing the various methods disclosed herein may take a relatively long time (e.g., about 24 hours), but the accuracy and reliability are greater and thus can be used to verify the accuracy of the disk allocation solution obtained by the first algorithm.

A process according to embodiments of the present disclosure will be described in detail below with reference to FIG. 2 to FIG. 5. For ease of understanding, specific data mentioned in the description here is illustrative and is not intended to limit the protection scope of the present disclosure. It should be understood that embodiments described below may also include additional actions not shown and/or may omit actions shown, and the scope of the present disclosure is not limited in this regard.

Figure 2:
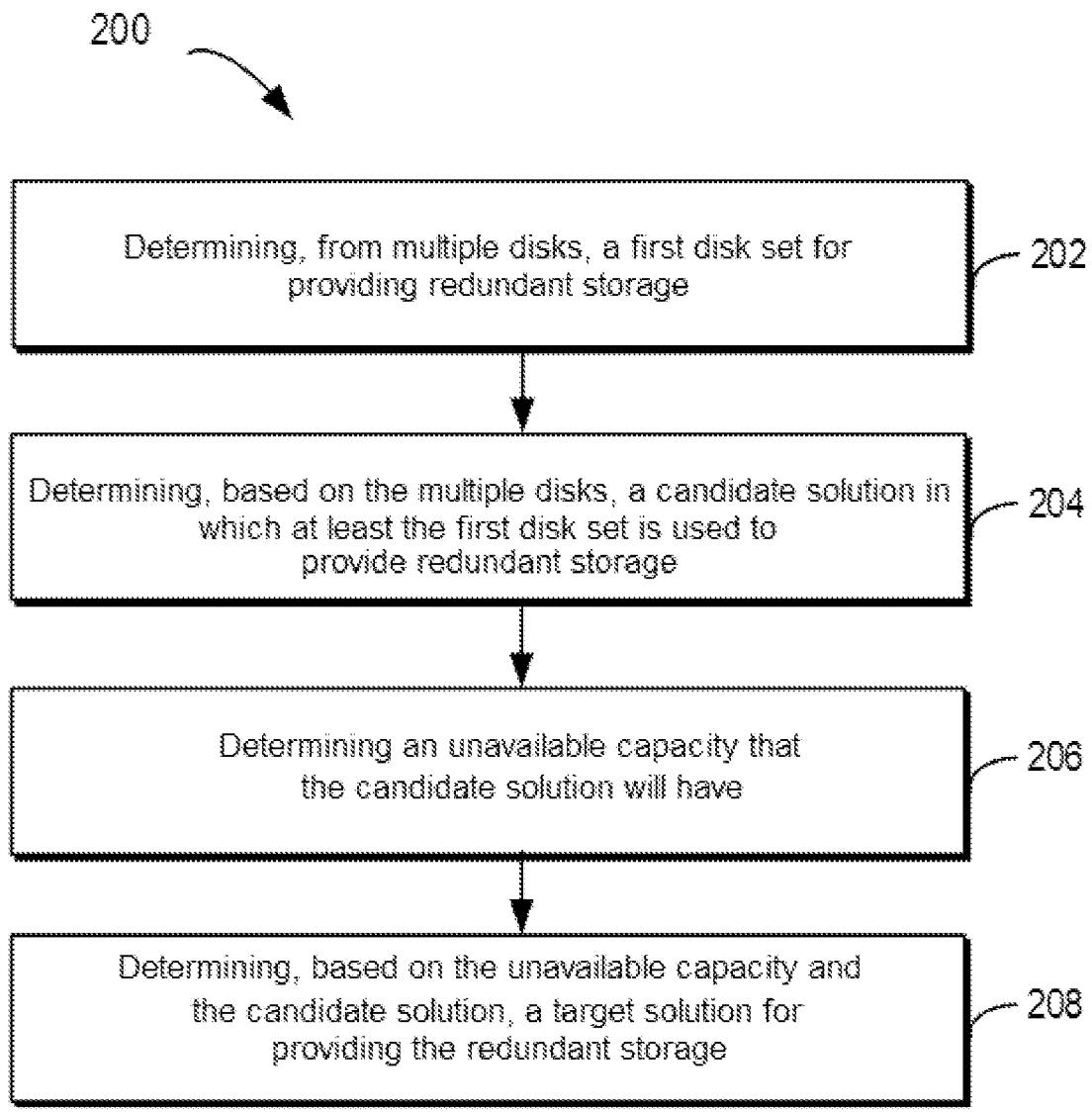
FIG. 2 illustrates a flow chart of a process for managing disks according to embodiments of the present disclosure.

FIG. 2 illustrates a flow chart of process 200 for managing disks according to embodiments of the present disclosure. Process 200 may be implemented at manager 102 as shown in FIG. 1. As shown in FIG. 2, at block 202, manager 102 can determine (or identify), from multiple disks, a first disk set for providing redundant storage. As discussed above, due to the requirements of a redundant array of independent disks (RAID), the number of disks included in the first disk set is not less than a first threshold number (a lower limit, for example, 6) that corresponds to the number of disks required to be included in a redundant array of independent disks.

In some embodiments, considering that the number of the multiple disks will be greater than a second threshold number (an upper limit, for example, 25) of disks allowed to be included in the first disk set, there may be multiple disk sets to provide redundant storage. Since the multiple disks may include multiple types of disks (for example, they are divided into disks of a first type, disks of a second type, and disks of a third type depending on the capacity), there will also be various possibilities for the first disk set.

At block 204, manager 102 can determine (or select), based on the multiple disks, a candidate solution in which at least the first disk set is used to provide redundant storage. In some embodiments, in order to reduce the consumption of computing resources and save computing overhead, the prediction of the unavailable capacity of the candidate solution does not necessarily need to use a combination of multiple disk sets, but may instead use a combination including the determined disk set and the remaining disks pending (yet to be allocated) in the multiple disks. The remaining disks may include disks in the multiple disks other than the determined disk set (e.g., the first disk set). The unavailable capacity of the determined disk set can be determined quickly and accurately, while the unavailable capacity that will be caused by the remaining disks is expected to be estimated quickly and accurately in some way.

At block 206, manager 102 can determine (or identify) an unavailable capacity that the candidate solution will have. As discussed above, the unavailable capacity will include the current unavailable capacity of the determined disk set as well as the predicted unavailable capacity of the remaining disks.

Some embodiments of the manner in which the unavailable capacity is determined will be described in detail below with reference to FIG. 4.

At block 208, manager 102 can determine (or select), based on the unavailable capacity and the candidate solution, a target solution for providing redundant storage. In some embodiments, the manager can compare the unavailable capacity with a threshold capacity. If it is determined that the unavailable capacity is not less than the threshold capacity, manager 102 updates the candidate solution based on the updated first disk set. The above process can be performed iteratively until it is determined that the unavailable capacity of the updated candidate solution is less than the threshold capacity. In some embodiments, if it is determined that the unavailable capacity is less than the threshold capacity, manager 102 can update the threshold capacity based on the updated unavailable capacity. In other words, the threshold capacity will likely change over time, and represents the optimized unavailable capacity of the optimized candidate solution among the multiple (updated) candidate solutions that have been tried currently. Using such threshold capacity, it is possible to always ensure that the candidate solution will be updated to be optimal, e.g., the sum of unavailable capacities of the included updated first disk set and the remaining disks is the minimum. Based on the updated candidate solution, manager 102 can determine a target solution.

In this way, by accurately estimating the unavailable capacities of candidate solutions, it is possible to accurately determine the disk allocation solution with the minimum unavailable capacity and thus facilitate efficient management of disks.

Figure 3:
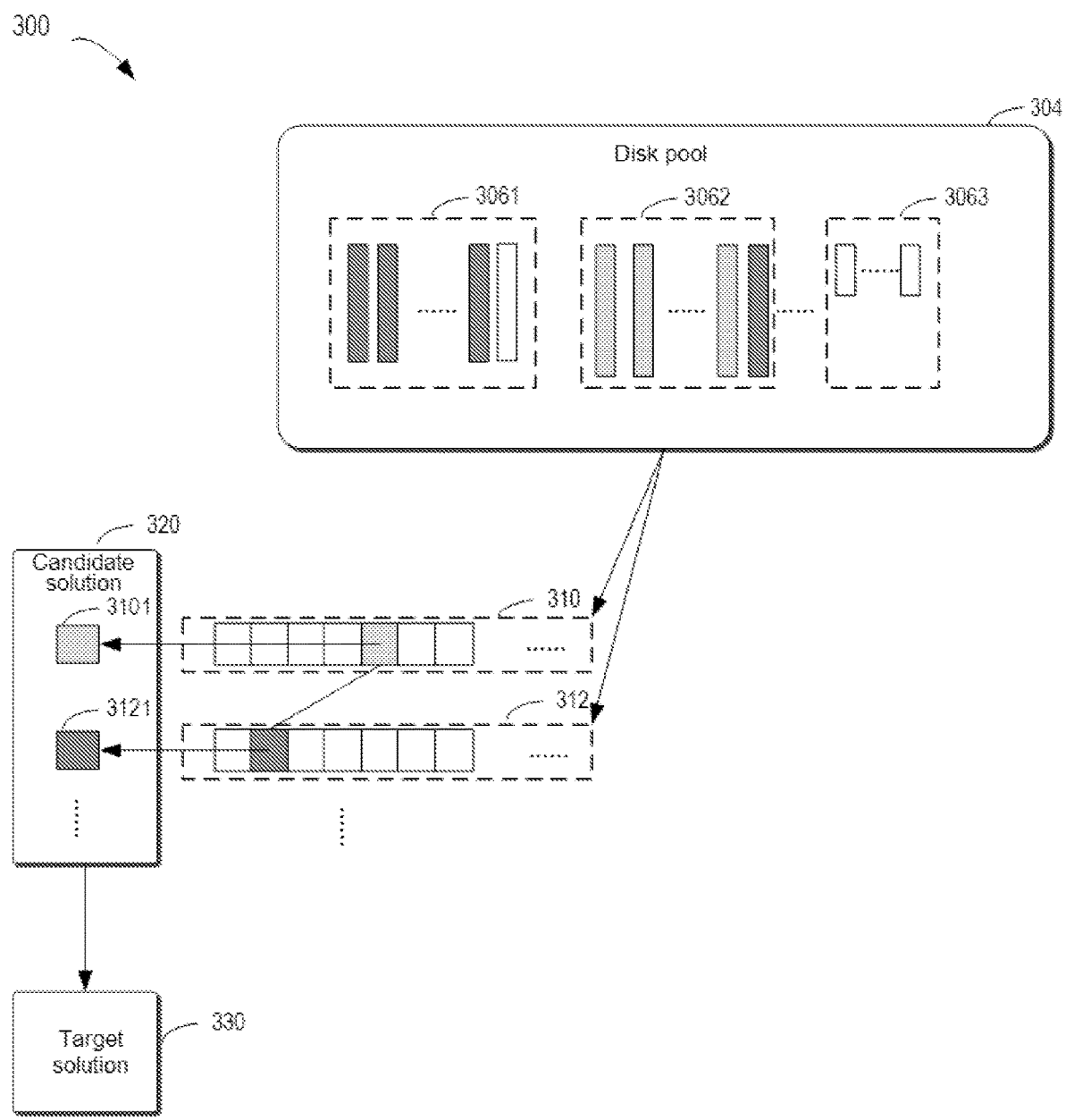
FIG. 3 illustrates a schematic diagram of a process for managing disks according to embodiments of the present disclosure.

For ease of description, the specific implementation of process 200 will be described below with reference to FIG. 3. FIG. 3 illustrates a schematic diagram of process 300 for managing disks according to embodiments of the present disclosure. In FIG. 3, description will be given by using disk pool 304 including disk 3062 of a first type and having a first capacity of 16 TB, disk 3061 of a second type and having a second capacity of 8 TB, and disk 3063 of a third type and having a third capacity of 4 TB as an example.

Manager 102 will first use the various types of disks 3061 to 3063 in disk pool 304 to determine the first disk set. Since there are multiple types of disks, the first disk set may correspond to group 310 of multiple possible options, and the type and/or number of disks included in the respective disk set corresponding to each possible option will be different. For example, in the case where there are three types of disks, the number of possible options will be C (27, 2). Manager 102 can select a first disk set corresponding to one possible option from group 310 as the first disk set to be used in candidate solution 320, and determine, based on the above comparison between the unavailable capacity and the threshold capacity, whether the first disk set (and therefore, candidate solution 320) needs to be updated. In this manner, manager 102 selects updated (e.g., optimal) first disk set 3101 from group 310 for use in determining updated candidate solution 310. The unavailable capacity of first disk set 3101 and the predicted unavailable capacity of the remaining disks in the disk pool will be optimized (e.g., minimum). Since using a first disk set corresponding to another option in group 310 in candidate solution 320 will not be possible to correspond to an optimized candidate solution, the subsequent associated calculation process will no longer be performed.

Thereafter, in a similar manner, manager 102 can further determine, from the multiple disks, a second disk set for providing redundant storage, disks in the second disk set being different from the disks in the first disk set. The second disk set can be determined from the remaining disks in the multiple disks other than first disk set 3101. It can be understood that in cases where the number of the remaining disks is still high and there are still many disk types included, the second disk set may still correspond to group 312 of multiple possible options. In a similar manner, the manager can determine updated second disk set 3121 from group 312 based on the above comparison between the unavailable capacity and a threshold capacity (e.g., indicating the current minimum unavailable capacity). Based on the determined second disk set, the manager can update the candidate solution to provide redundant storage using first disk set 3101 and second disk set 3121. Similarly, since a combination formed by using first disk set 3101 and a second disk set corresponding to another option in group 312 in candidate solution 320 will not be possible to correspond to an optimized candidate solution, the subsequent associated calculation process will no longer be performed.

In a similar manner, depending on the number of disks in the disk pool, the manager can also perform a determination process related to more disk sets until all disks in the disk pool have been allocated to corresponding optimized disk sets. In response to determining that all disks are allocated to corresponding optimized disk sets, the manager can determine final candidate solution 320, and accordingly determine (in one embodiment, determine, by comparison, the solution to be verified as) target solution 330.

By predicting the unavailable capacities of the candidate solutions and using the unavailable capacity of the current optimized candidate solution as the threshold capacity, there is no need to determine unavailable capacities of all possible combinations of the disk sets, and a final optimized candidate solution can be quickly and accurately determined.

An embodiment of the pseudo-code used for process 300 above is illustrated below. The further implementation for the unavailable capacity of the determined disk set and the predicted unavailable capacity of the remaining disks will be described in detail in the process as well as the pseudo-code described below with reference to FIG. 4.

```
//This piece of pseudo-code is used to determine disk sets included in the updated candidate
solution (target solution or reference solution)
//The maximum value of level is equal to the number of RRSs that can be constructed from all
disks
//remained_disks indicates disks other than those of the constructed RRSs
//waste_before indicates the unavailable capacity of the determined RRS in the candidate
solution
//best_solution_till_now indicates the updated candidate solution with the minimum
unavailable capacity
GetMinimalWaste (level, remained_disks, waste_before, best_solution_till_now)
{
   if (level == MAX_LEVEL) {
      if (waste_before < GetWaste(best_solution_till_now)) {
         Update(best_solution_till_now);
      }
      return 0;
   }
   for all possible combinations in this level {
      remained_disks' = remained_disks - current_combination; //Updating the remaining disks
(removing the determined disk set)
      this_level_waste = GetActualWaste(current_combination); //The unavailable capacity of the
determined disk set
      minimum_will_waste = GetPredictWaste(remained_disks'); //The predicted unavailable
capacity of the remaining disks
```

```
    if (waste_before + this_level_waste + minimum_will_waste
        >= GetActualWaste(best_solution_till_now))
    {
        continue; // This candidate solution cannot make the unavailable capacity optimized, thus
skipping the branch, and performing an update
    }
    GetMinimalWaste (level+1,
        remained_disks',
        waste_before + this_level_waste,
        best_solution_till_now);
    }
}
```

Figure 4:
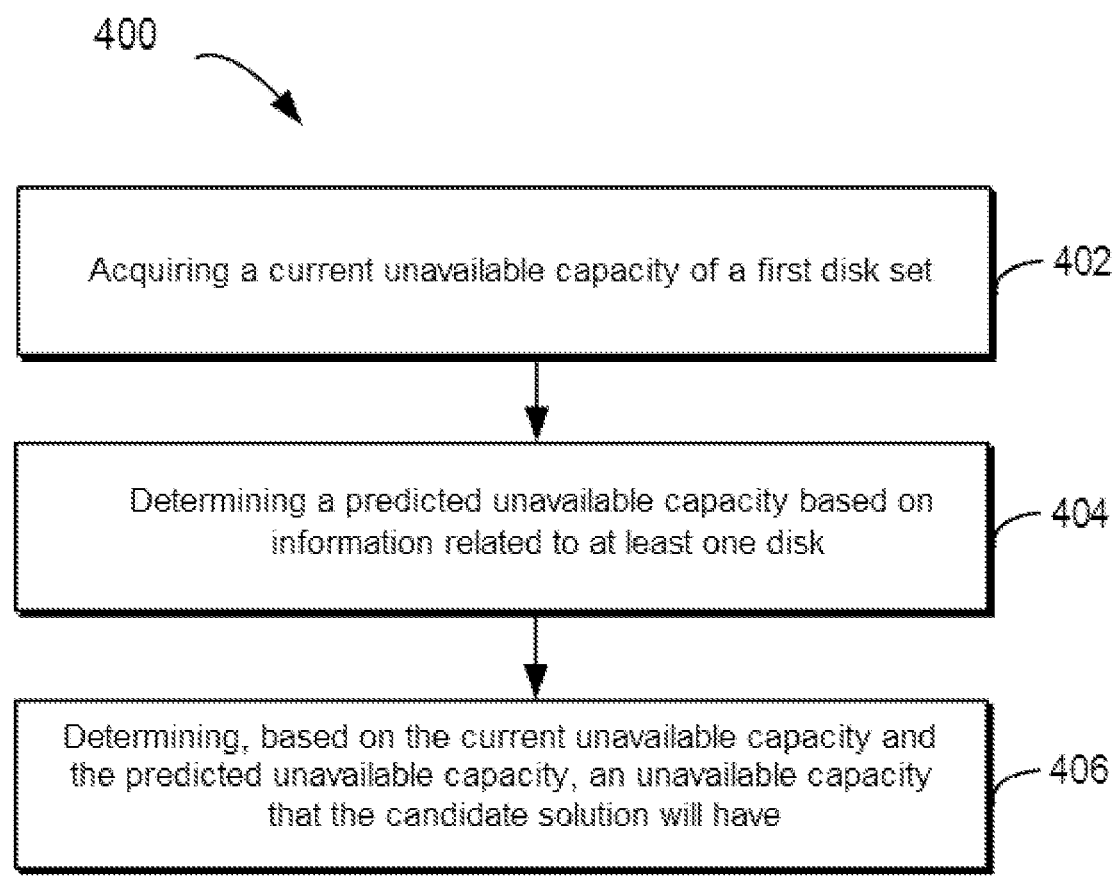
FIG. 4 illustrates a schematic diagram of a process for determining an unavailable capacity that a candidate solution will have according to embodiments of the present disclosure.

FIG. 4 illustrates a schematic diagram of process 400 for determining an unavailable capacity that a candidate solution will have according to embodiments of the present disclosure. Process 400 may be implemented at manager 102 as shown in FIG. 1. Process 400 may be a specific embodiment of block 206 in FIG. 2. As shown in FIG. 2, at block 402, manager 102 can acquire the current unavailable capacity of the first disk set. Since the disk set constituted from disks in the first disk set is determined, its current unavailable capacity can be determined simply based on the numbers of disks of various types and capacities of disks of the various types. For example, assuming that the first disk set includes sixteen 16 TB disks and nine 4 T disks, it can be determined that the first disk set has an unavailable capacity of 16 TB based on the previous discussion on unavailable capacity.

At block 402, manager 102 can determine (or derive) the predicted unavailable capacity based on information related to at least one disk (sometimes referred to hereinafter as the remaining disks) in the multiple disks other than the first disk set, the above information including at least one of the following: the total number of the at least one disk, types of disks in the at least one disk, and the number of disks of each type.

Specifically, in some cases, it is still possible to construct multiple disk sets from the remaining disks, and therefore, there are a variety of possibilities. For example, assuming that the remaining disks include four 16 TB disks, sixteen 8 TB disks, and fifty-seven 4 TB disks, it is still necessary to construct at least 4 disk sets. In some embodiments, multiple disk sets corresponding to multiple possibilities can be calculated respectively to determine the predicted unavailable capacity, but in some cases, the number of possibilities to be calculated in such calculation process is still high. Therefore, it will still consume significant computing resources and take a lot of computing time.

In this regard, in some embodiments, instead of actually calculating multiple possibilities, the manager can simply determine the predicted unavailable capacity according to a prediction algorithm and based on information related to the remaining disks, wherein this predicted unavailable capacity will be close to the minimum unavailable capacity that multiple disk sets constructed from the remaining disks have.

In some embodiments, the prediction algorithm can determine the unavailable capacity that will be caused by the remaining disks by the following. If it is determined that the total number of disks in the remaining disks (e.g., at least one disk) is less than the first threshold number, the predicted unavailable capacity is determined based on the total capacity of disks in the at least one disk. Specifically, in such case, the number of the remaining disks is insufficient to support the construction of one RAID (and thus a disk set), so their capacities will be wasted and can be used to determine the predicted unavailable capacity.

If the total number of disks in the remaining disks (e.g., at least one disk) is not less than the first threshold number, manager 102 can determine that the remaining disks are capable of supporting the construction of at least one disk set. In this case, manager 102 can compare the number of disks of a first type in the remaining disks with the first threshold number. A disk of the first type may have a large (e.g., maximum) first capacity (e.g., 16 TB) and may thus result in a large fraction of the unavailable capacity. Therefore, the prediction algorithm may first estimate that large fraction.

Next, manager 102 can compare the number of disks of the first type and the first threshold number. If the comparison determines that the number of disks of the first type in the remaining disks (e.g., at least one disk) is less than the first threshold number, manager 102 can determine that disks of the first type are not capable of supporting the construction of one RAID and that disks of a second type will be used to construct one disk set, a disk of the second type having a second capacity (e.g., 8 TB) smaller than the first capacity. In this case, manager 102 can determine the predicted unavailable capacity based on the number of disks of the first type. For example, the predicted unavailable capacity can be determined by adding the product of the number of disks of the first type and the wasted capacity (8 T) of disks of the first type to the second capacity of a disk of the second type that is used to provide the reserved capacity.

If it is determined that the number of disks of the first type in the remaining disks is not less than the first threshold number, manager 102 can determine that disks of the first type are capable of supporting the construction of one RAID (and thus a disk set). In this case, the manager can determine the predicted unavailable capacity based on the number of disks of the first type. In some embodiments, the manager can determine, based on the number of disks of the first type, the number of disk sets for the disk sets constructed with the support of these disks, and then determine the predicted unavailable capacity based on the product of the number of disk sets and the first capacity.

So far, based on the prediction algorithm, the manager can take into account the impact of disks of the first type with a large capacity on the predicted unavailable capacity. Next, based on the prediction algorithm, the manager can take into account the impact of disks of the second type on the predicted unavailable capacity. In some embodiments, the second capacity of a disk of the second type is the second largest among all the remaining disks.

Further, manager 102 can determine, based on the second threshold number, a first number of disk sets that can be constructed from disks of the first type, and can determine, based on the second threshold number, a second number of disk sets that can be constructed from both disks of the first type and disks of the second type. As discussed above, the second threshold number is the upper limit of the number of disks that can be included in a disk set.

Manager 102 can compare the first number with the second number. If it is determined that the second number is greater than the first number, manager 102 can determine that disks of the second type are also capable of constructing additional disk sets. In this case, manager 102 can determine that the predicted unavailable capacity also includes a first additional unavailable capacity, i.e., in a disk set constructed from disks of the second type, the unavailable capacity caused by the reserved capacity is provided by disks of the second type as reserved disks. Thus, the first additional unavailable capacity can be determined based on the second number, the first number, and the second capacity, and subsequently used to determine the predicted unavailable capacity. The number of disk sets constructed from disks of the second type may be equal to the difference between the second number and the first number.

If it is determined that the second number is not greater than the first number, manager 102 can determine that disks of the second type are not capable of constructing an additional disk set. In this case, manager 102 can compare the sum of the number of disks of the first type and the number of disks of the second type with the first threshold number. If the sum of the numbers is less than the first threshold number, manager 102 can determine that disks of the first and second types are not capable of supporting the construction of one additional disk set, and that disks of a third type will be used to construct one additional disk set, a disk of the third type having a second capacity (e.g., 4 TB) less than the second capacity. In this case, the manager can determine that the predicted unavailable capacity also includes a second additional unavailable capacity, and the second additional unavailable capacity may be determined based on the sum of the above numbers. For example, the second additional unavailable capacity can be determined by adding the product of the sum of the above numbers and the wasted capacity (e.g., 4 TB) of disks of the second type to the third capacity of a disk of the third type that is used to provide the reserved capacity, and subsequently used to determine the predicted unavailable capacity.

An embodiment of the pseudo-code used to determine the predicted unavailable capacity is illustrated below. A disk of the first type has a first capacity of 16 TB, a disk of the second type has a second capacity of 8 TB, and a disk of the third type has a second capacity of 4 TB. It is conceivable that the processes and/or pseudo-code described herein can be modified accordingly depending on capacities of actual disks to obtain various embodiments.

```
//This piece of pseudo-code is used to quickly predict the unavailable capacity of at least one
disk remaining in unallocated disks other than a candidate disk set
//The predicted unavailable capacity will not be more than the actual unavailable capacity
GetPredictWaste(disks)
{
    // Is the total number of the remaining disks enough to construct one RRS
    if (nTotalDisks < RAID_WIDTH && nTotalDisks != 0)
        return PENALTY_WASTE; //Not enough, the capacity of the disks will be wasted
    // Is it enough to construct one RRS using 16 TB disks in the remaining disks
    If (n_disks_16T < MIN_DISKS_IN_ONE_RRS && n_disks_16T != 0) {
        minimal_waste = n_disks_16T * 8T + 8T; //Not enough, there are wasted capacity and
reserved capacity
    } else {
        n_RRS16 = HOW_MANY(n_disks_16T, MAX_DISKS_IN_ONE_RRS); //16 TB, the
number of RRSs
        minimal_waste = n_RRS16 * 16T; //Enough, there is reserved capacity
    }
    // Is it possible to construct an RRS by further using 8 TB disks in the remaining disks
    N_RRS8_plus = HOW_MANY(n_disks_16T + n_disks_8T,
MAX_DISKS_IN_ONE_RRS);
    if (N_RRS8_plus > n_RRS16) {
        minimal_waste += (N_RRS8_plus - n_RRS16) * 8T; // Yes, the first additional unavailable
capacity of 8 TB RRS
    } else if (n_disks_16T_&_8T < MIN_DISKS_IN_ONE_RRS) {//No, a 4 TB disk is further
used
        minimal_waste += (n_disks_16T + n_disks_8T) * 4T + 4T; //There is a second additional
unavailable capacity
    }
    return minimal_waste;
}
```

At block 406, manager 102 determines, based on the current unavailable capacity and the predicted unavailable capacity, the unavailable capacity that the candidate solution will have. In some embodiments, the manager can determine, based on the sum of the above current unavailable capacity and predicted unavailable capacity, the unavailable capacity that the candidate solution will have.

In this way, the manager is capable of determining, with less computing overhead and higher speed, the predicted unavailable capacity of the remaining unallocated disks to be used in the candidate solution, and then accurately predict the unavailable capacity of the candidate solution.

In some embodiments, it takes a relatively long time to execute any of processes 200 to 400, but the determined target solution is relatively accurate, so any of processes 200 to 400 can also be used for verification purposes. For example, the manager can determine a reference solution based at least on the candidate solution through any of processes 200 to 400. In the reference solution, multiple reference disk sets are used to provide redundant storage and the multiple reference disk sets include all disks in the multiple disks. The manager can also determine a solution to be verified by another algorithm (such as those algorithms described in 201911052954.6, 201910336148.5, and 201911050325.X). In the solution to be verified, multiple disk sets to be verified are used to provide redundant storage, and the multiple disk sets to be verified includes all disks in the multiple disks. The manager can then compare the reference solution with the solution to be verified, and if it is determined that the reference solution is consistent with the solution to be verified, the solution to be verified can be determined as the target solution. For example, if the multiple reference disk sets included in the reference solution is the same as the disk sets to be verified in the solution to be verified, it can be indicated that the solution to be verified will also have an optimized unavailable capacity, and thus the accuracy of the another algorithm can be indicated.

In some embodiments, where less attention is paid to the computing resources consumed and time spent, any of processes 200 to 400 may also be used for the allocation of multiple disks to multiple disk sets, so as to determine the target solution to provide redundant storage.

Figure 5:
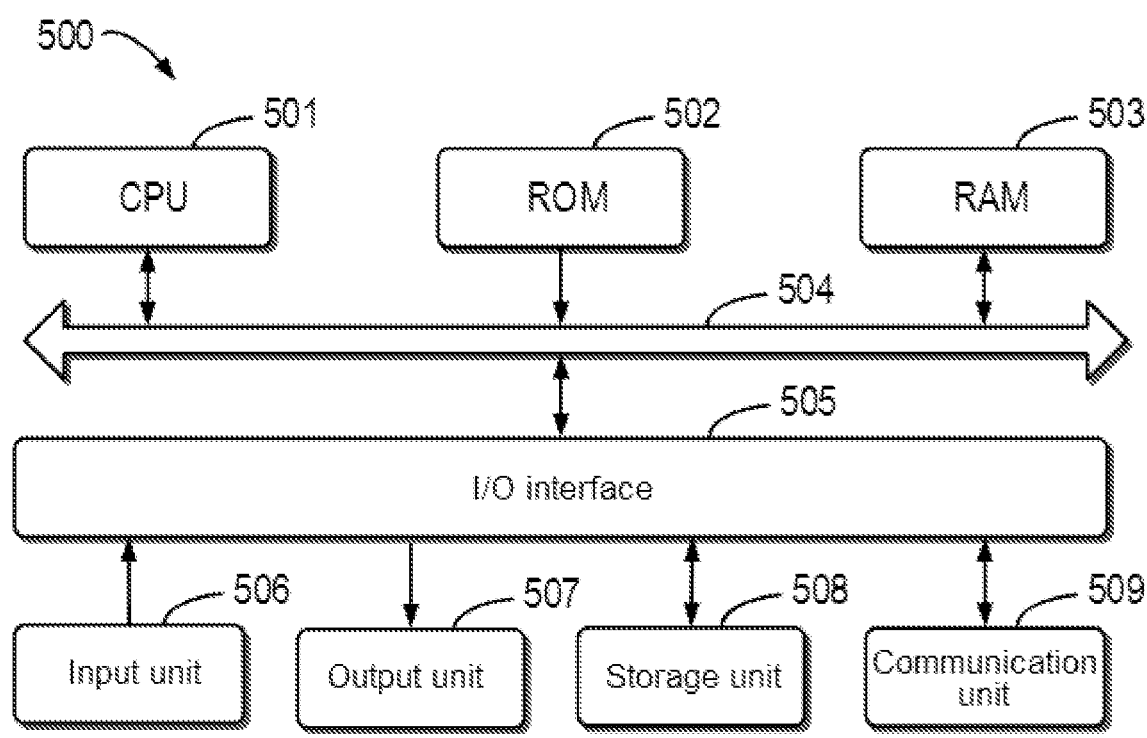
FIG. 5 illustrates a block diagram of an example device that can be used to implement embodiments of the present disclosure.

FIG. 5 illustrates a schematic block diagram of example electronic device 600 that can be used to implement the embodiments of the present disclosure. For example, electronic device 500 can be used to implement computing device 105 shown in FIG. 1. As shown in the figure, device 500 includes central processing unit (CPU) 501 that may perform various appropriate actions and processing according to computer program instructions stored in read-only memory (ROM) 502 or computer program instructions loaded from storage unit 508 into random access memory (RAM) 503. In RAM 503, various programs and data required for the operation of device 500 may also be stored. CPU 501, ROM 502, and RAM 503 are connected with each other through bus 504. Input/output (I/O) interface 505 is also connected to bus 504.

Multiple components in device 500 are connected to I/O interface 505, including: input unit 506, such as a keyboard and a mouse; output unit 507, such as various types of displays and speakers; storage unit 508, such as a magnetic disk and an optical disk; and communication unit 509, such as a network card, a modem, and a wireless communication transceiver. Communication unit 509 allows device 500 to exchange information/data with other devices through a computer network such as the Internet and/or various telecommunication networks.

Processing unit 501 executes various methods and processing described above, e.g., any one of processes 200, 300, and 400. For example, in some embodiments, any one of processes 200, 300, and 400 may be embodied as a computer software program or a computer program product that is tangibly included in a machine-readable medium, e.g., storage unit 508. In some embodiments, part or all of the computer program may be loaded and/or installed to device 500 via ROM 502 and/or communication unit 509. When the computer program is loaded into RAM 503 and executed by CPU 501, one or more steps of any of processes 200, 300, and 400 described above may be performed. Alternatively, in other embodiments, CPU 501 may be configured in any other suitable manner (e.g., by means of firmware) to implement any one of processes 200, 300, and 400.

The present disclosure may be a method, an apparatus, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electric storage device, a magnetic storage device, an optical storage device, an electromagnetic storage device, a semiconductor storage device, any non-transitory storage device, or any suitable combination of the foregoing. More specific examples (a non-exhaustive list) of the computer-readable storage medium include: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital versatile disk (DVD), a memory stick, a floppy disk, a mechanical coding device such as a punch card or protrusions in a groove on which instructions are stored, and any appropriate combination of the above. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

The computer program instructions for executing the operation of the present disclosure may be assembly instructions, instruction set architecture (ISA) instructions, machine instructions, machine-dependent instructions, microcode, firmware instructions, state setting data, or source code or object code written in any combination of one or more programming languages, the programming languages including object-oriented programming languages such as Smalltalk, C++, and the like, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions to implement various aspects of the present disclosure.

Various aspects of the present disclosure are described here with reference to flow charts and/or block diagrams of the method, the apparatus (system), and the computer program product implemented according to the embodiments of the present disclosure. It should be understood that each block of the flow charts and/or block diagrams and combinations of blocks in the flow charts and/or block diagrams may be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means (e.g., specialized circuitry) for implementing functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various embodiments of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, and sometimes they may also be executed in an inverse order, which depends on involved functions. It should be further noted that each block in the block diagrams and/or flow charts as well as a combination of blocks in the block diagrams and/or flow charts may be implemented using a dedicated hardware-based system that executes specified functions or actions, or using a combination of special hardware and computer instructions.

Various implementations of the present disclosure have been described above. The foregoing description is illustrative rather than exhaustive, and is not limited to the disclosed implementations. Numerous modifications and alterations are apparent to persons of ordinary skill in the art without departing from the scope and spirit of the illustrated implementations. The selection of terms used herein is intended to best explain the principles and practical applications of the implementations or the improvements to technologies on the market, or to enable other persons of ordinary skill in the art to understand the implementations disclosed herein.

The invention claimed is:

1. A method for managing disks, comprising:
    determining, from multiple disks, a first disk set for providing redundant storage, the number of disks included in the first disk set being not less than a first threshold number that corresponds to the number of disks required to be included in a redundant array of independent disks;
    determining, based on the multiple disks, a candidate solution in which at least the first disk set is used to provide redundant storage;
    determining an unavailable capacity that the candidate solution will have; and
    determining, based on the unavailable capacity and the candidate solution, a target solution for providing the redundant storage.

2. The method according to claim 1, wherein determining an unavailable capacity that the candidate solution will have includes:
    acquiring a current unavailable capacity of the first disk set;
    determining a predicted unavailable capacity based on information related to at least one disk among the multiple disks other than the first disk set, the information including at least one of the following: the total number of the at least one disk, types of disks in the at least one disk, and the number of disks of each type; and
    determining, based on the current unavailable capacity and the predicted unavailable capacity, the unavailable capacity that the candidate solution will have.

3. The method according to claim 2, wherein determining the predicted unavailable capacity includes:
    determining, if it is determined that the total number of disks in the at least one disk is less than the first threshold number, the predicted unavailable capacity based on the total capacity of disks in the at least one disk.

4. The method according to claim 2, wherein determining the predicted unavailable capacity includes:
    comparing, if the total number of disks in the at least one disk is not less than the first threshold number, the number of disks of a first type in the at least one disk with the first threshold number;
    determining, if it is determined that the number of disks of the first type in the at least one disk is less than the first threshold number, the predicted unavailable capacity based on the number of disks of the first type, a disk of the first type having a first capacity, and a disk of the second type having a second capacity less than the first capacity; and
    determining, if it is determined that the number of disks of the first type is not less than the first threshold number, the predicted unavailable capacity based on the number of disks of the first type.

5. The method according to claim 4, wherein determining the predicted unavailable capacity based on the number of disks of the first type includes:
    determining, based on a second threshold number, a first number of disk sets that can be constructed from disks of the first type;

determining, based on the second threshold number, a second number of disk sets that can be constructed from disks of the first type and disks of the second type; and determining, if it is determined that the second number is greater than the first number, that the predicted unavailable capacity further includes a first additional unavailable capacity that is determined based on the second number and the first number.

6. The method according to claim 5, further comprising:
comparing, if it is determined that the second number is not greater than the first number, the sum of the number of disks of the first type and the number of disks of the second type with the first threshold number; and determining, if the sum of the numbers is less than the first threshold number, that the predicted unavailable capacity further includes a second additional unavailable capacity that is determined based on the sum of the numbers.

7. The method according to claim 1, wherein determining the target solution includes:
updating, if it is determined that the unavailable capacity is not less than a threshold capacity, the candidate solution based on an updated first disk set until it is determined that an unavailable capacity of the updated candidate solution is less than the threshold capacity; and determining the target solution based on the updated candidate solution.

8. The method according to claim 1, wherein determining the candidate solution further includes:
determining, from the multiple disks, a second disk set for providing redundant storage, disks in the second disk set being different from disks in the first disk set; and
updating the candidate solution to provide redundant storage using the first disk set and the second disk set.

9. The method according to claim 1, wherein determining the target solution includes:
determining, based at least on the candidate solution, a reference solution in which multiple reference disk sets are used to provide redundant storage, the multiple reference disk sets including all disks in the multiple disks;

comparing the reference solution with a solution to be verified that is determined by another algorithm, wherein in the solution to be verified, multiple disk sets to be verified are used to provide redundant storage, the multiple disk sets to be verified including all disks in the multiple disks; and determining, if it is determined that the reference solution is consistent with the solution to be verified, the to-be-verified solution as the target solution.

10. The method according to claim 1, wherein the multiple disk sets are multiple redundant array of independent disks resilience sets (RRSs).

11. An electronic device, comprising:
a processor; and
a memory coupled to the processor and having instructions stored therein, wherein the instructions, when executed by the processor, cause the electronic device to execute actions including:
determining, from multiple disks, a first disk set for providing redundant storage, the number of disks included in the first disk set being not less than a first threshold number that corresponds to the number of disks required to be included in a redundant array of independent disks;

determining, based on the multiple disks, a candidate solution in which at least the first disk set is used to provide redundant storage;

determining an unavailable capacity that the candidate solution will have; and determining, based on the unavailable capacity and the candidate solution, a target solution for providing the redundant storage.

12. The device according to claim 11, wherein determining an unavailable capacity that the candidate solution will have includes:
acquiring a current unavailable capacity of the first disk set;

determining a predicted unavailable capacity based on information related to at least one disk among the multiple disks other than the first disk set, the information including at least one of the following: the total number of the at least one disk, types of disks in the at least one disk, and the number of disks of each type; and determining, based on the current unavailable capacity and the predicted unavailable capacity, the unavailable capacity that the candidate solution will have.

13. The device according to claim 12, wherein determining the predicted unavailable capacity includes:
determining, if it is determined that the total number of disks in the at least one disk is less than the first threshold number, the predicted unavailable capacity based on the total capacity of disks in the at least one disk.

14. The device according to claim 12, wherein determining the predicted unavailable capacity includes:
comparing, if the total number of disks in the at least one disk is not less than the first threshold number, the number of disks of a first type in the at least one disk with the first threshold number;

determining, if it is determined that the number of disks of the first type in the at least one disk is less than the first threshold number, the predicted unavailable capacity based on the number of disks of the first type, a disk of the first type having a first capacity, and a disk of the second type having a second capacity less than the first capacity; and determining, if it is determined that the number of disks of the first type is not less than the first threshold number, the predicted unavailable capacity based on the number of disks of the first type.

15. The device according to claim 14, wherein determining the predicted unavailable capacity based on the number of disks of the first type includes:
determining, based on a second threshold number, a first number of disk sets that can be constructed from disks of the first type;

determining, based on the second threshold number, a second number of disk sets that can be constructed from disks of the first type and disks of the second type; and determining, if it is determined that the second number is greater than the first number, that the predicted unavailable capacity further includes a first additional unavailable capacity that is determined based on the second number and the first number.

16. The device according to claim 15, wherein the actions further include:
comparing, if it is determined that the second number is not greater than the first number, the sum of the number of disks of the first type and the number of disks of the second type with the first threshold number; and determining, if the sum of the numbers is less than the first threshold number, that the predicted unavailable capacity further includes a second additional unavailable capacity that is determined based on the sum of the numbers.

17. The device according to claim 11, wherein determining the target solution includes:

updating, if it is determined that the unavailable capacity is not less than a threshold capacity, the candidate solution based on an updated first disk set until it is determined that an unavailable capacity of the updated candidate solution is less than the threshold capacity; and determining the target solution based on the updated candidate solution.

18. The device according to claim 11, wherein determining the candidate solution further includes:

determining, from the multiple disks, a second disk set for providing redundant storage, disks in the second disk set being different from disks in the first disk set; and updating the candidate solution to provide redundant storage using the first disk set and the second disk set.

19. The device according to claim 11, wherein determining the target solution includes:

determining, based at least on the candidate solution, a reference solution in which multiple reference disk sets are used to provide redundant storage, the multiple reference disk sets including all disks in the multiple disks;

comparing the reference solution with a solution to be verified that is determined by another algorithm, wherein in the solution to be verified, multiple disk sets to be verified are used to provide redundant storage, the multiple disk sets to be verified including all disks in the multiple disks; and determining, if it is determined that the reference solution is consistent with the solution to be verified, the to-be-verified solution as the target solution.

20. The device according to claim 11, wherein the multiple disk sets are multiple redundant array of independent disks resilience sets (RRSs).

21. A computer program product having a non-transitory computer readable medium which stores a set of instructions to manage disks; the set of instructions, when carried out by computerized circuitry, causing the computerized circuitry to perform a method of:

determining, from multiple disks, a first disk set for providing redundant storage, the number of disks included in the first disk set being not less than a first threshold number that corresponds to the number of disks required to be included in a redundant array of independent disks;

determining, based on the multiple disks, a candidate solution in which at least the first disk set is used to provide redundant storage;

determining an unavailable capacity that the candidate solution will have; and determining, based on the unavailable capacity and the candidate solution, a target solution for providing the redundant storage.

\* \* \* \* \*